Nov. 5, 1929.     E. J. SWEETLAND     1,734,652
FILTER
Filed May 17, 1924     3 Sheets-Sheet 3

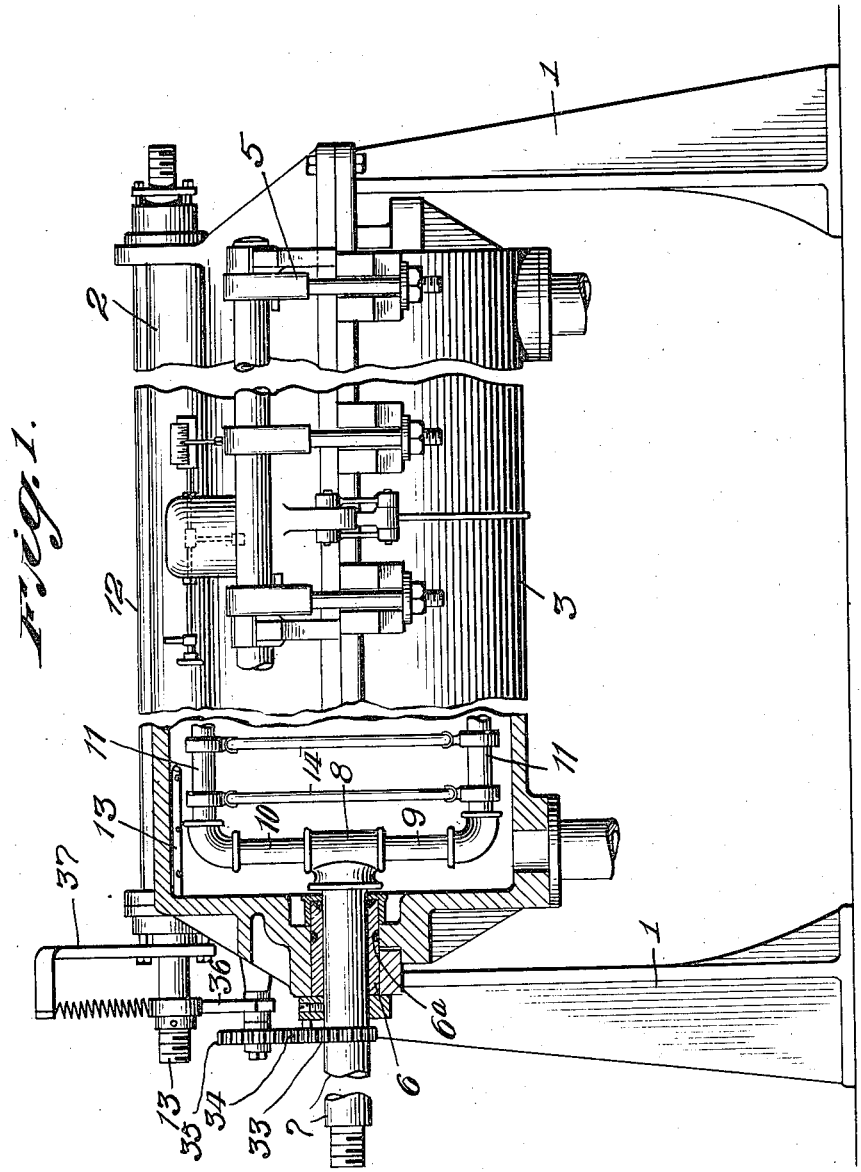

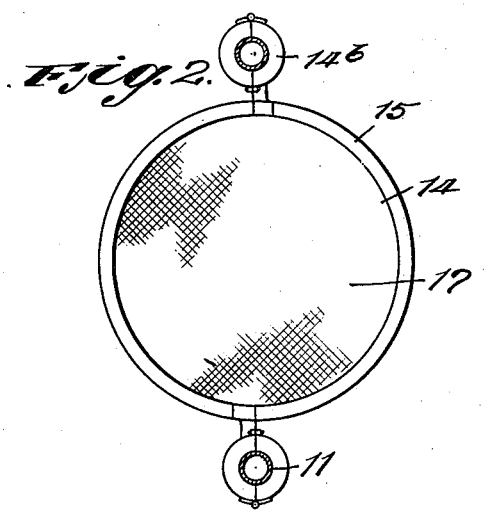
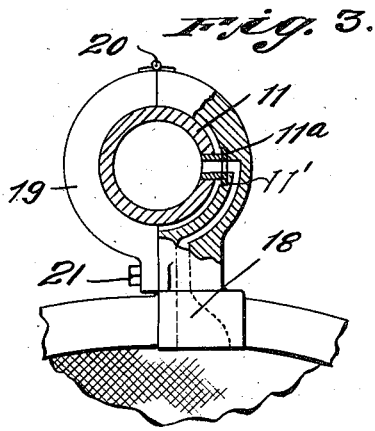
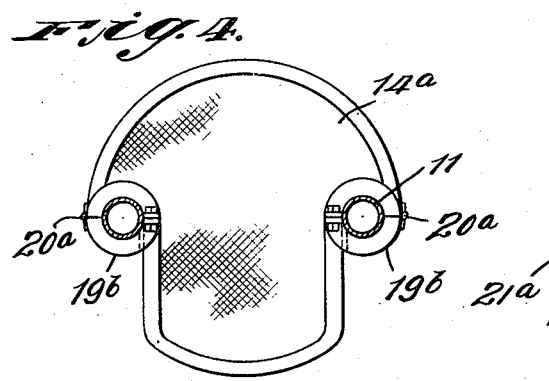
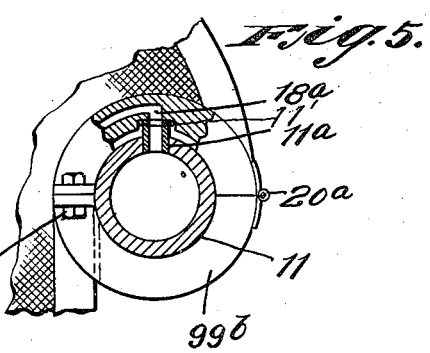
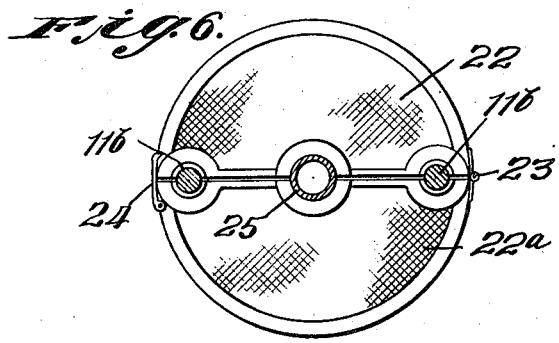

INVENTOR
Ernest J. Sweetland
BY
William P. Hammond
ATTORNEY

Patented Nov. 5, 1929

1,734,652

UNITED STATES PATENT OFFICE

ERNEST J. SWEETLAND, OF HAZLETON, PENNSYLVANIA, ASSIGNOR TO UNITED FILTERS CORPORATION, OF NEW YORK, N. Y., A CORPORATION OF DELAWARE

FILTER

Application filed May 17, 1924. Serial No. 713,901.

This invention relates to filters of the pressure type in which the material to be filtered is introduced into a closed compartment under pressure and finds its way out by passing thru filter cloth or other filtering material on which the solids are deposited in the form of filter cake and the clean filtrate is led away.

The invention is more particularly applicable to filters of the type in which the filter element or the filter leaves are adapted to be moved relative to the casing or containing tank, preferably by being rotated in the tank by rotating the mechanism upon which they are supported.

The invention as to all of the disclosure except Figure 6 continues the subject matter of the filter of my copending application Serial No. 271,009, filed January 14, 1919, now patent No. 1,510,568, granted October 7, 1924, which application was in turn a division of the then copending application Serial No. 146,056, filed February 2, 1917, Patent No. 1,313,929, granted August 16, 1919.

In the prior filter mechanisms of this type, great difficulty has been experienced in removing from the filter any single filter leaf which might become defective, it, being necessary, in some instances when the filter leaves are mounted upon a central drainage shaft, to take down the filter completely and remove all the filter leaves or elements between the defective element and the end of the shaft in order to remove the defective filter element.

It is one of the objects of the present invention to provide a filter of the type described in which any of the filter leaves or elements may be readily removed from the supports or drainage shafts therefor without disturbing the remaining leaves upon the support or drainage shaft.

Another object of the invention is to provide a filter of the type described in which the filter element may be supported upon a non-central drainage or supporting means preferably arranged at the sides of the filter and on which the filter elements are mounted in such a way as to be readily removed from the side support or drainage members by merely loosening the filter leaf from the supporting members and lifting it from the support.

Another object of the invention is to provide a filter of the type described in which the filter elements may be supported inside the filter tank or casing on supports other than the drainage tube.

A further object of the invention is to provide a split filter leaf which is divided approximately on the medial line thereof so that each half of the filter element may be removed from its support or drainage member by unclamping one side of the two elements and swinging the two halves around the hinge connecting the same.

Various other and more specific objects of the invention will appear as the description thereof proceeds.

Referring now to the drawings which illustrate various forms of embodiment of the invention.

Figure 1 is a side view partially in section of one form of filter mechanism in which the invention may be embodied.

Figure 2 is a side view of one of the filter elements mounted on the supporting members illustrated in Figure 1.

Figure 3 is a detail view of the mounting of the filter element on the support and the means for draining the filter element into the supporting means.

Figure 4 is a side view of a modified form of filter element.

Figure 5 is a part sectional detail of the means for mounting the filter element shown in Figure 4.

Figure 6 is a side view of one form of the split filter element.

Figure 7:
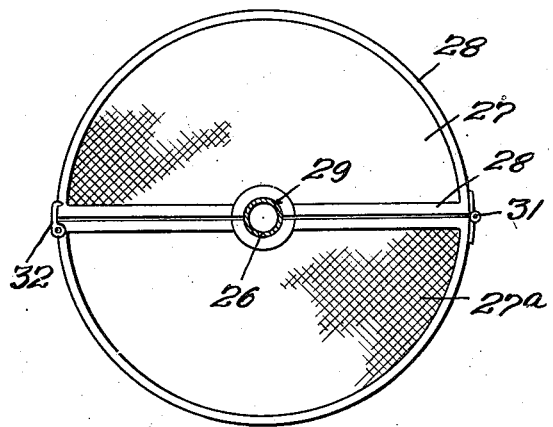
Figure 7 is a view similar to Figure 6 showing the split filter leaf construction mounted upon and supported by the central drainage tube.
Figure 9:
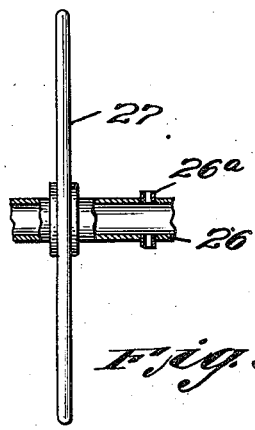
Figure 9 is a part sectional detail showing the construction of the central drainage tube for receiving the filter elements.
Figure 10:
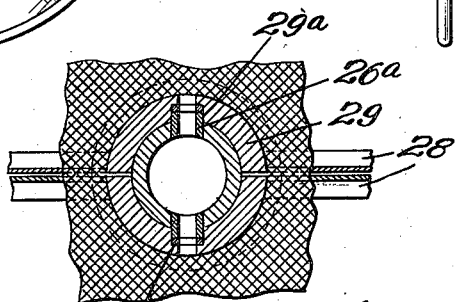
Figure 10 is a detail view of the mounting of the split filter leaf upon the central drainage tube so as to communicate therewith.

In the embodiment of the invention illustrated in Figure 1, 1 designates the posts or standards adapted to support the drainage shaft and filter leaf supports and the upper semi-cylindrical member 2 of the filter casing, which casing is completed by a lower semi-cylindrical member 3 preferably attached to the upper member along one side by suitable hinge members so as to be swung downwardly therefrom to permit access to the lower portion of the filter elements and the casing for the purpose of cleaning the same and secured along the other side by means of bolts 5 for clamping the members 2 and 3 together. Suitable packing is provided between the meeting faces of the portions 2 and 3 of the filter casing and the bushing 6 thru which the drainage tube 7 passes is also packed as indicated at $6^a$ to prevent the leaking of the fluid from the filter as has been thoroughly described in the copending application above identified.

Passing thru the bushings 6 in the ends of the filter casing formed by the sections 2 and 3 is a drainage tube 7 thru which the filtrate is conducted from the filter leaves 14 inside the filter casing. The tube 7 is provided with a T connection 8 from which extends the branch pipes 9 and 10 to the sides of the filter casing. The drainage pipes 11 upon which the filter leaves are mounted, extend along the side walls of the filter casing and are connected at each end to the pipes 9 and 10 so that the filtrate which enters the pipes 11 may be drawn out of the filter casing thru the drainage tube 7. Suitable means are provided for turning the tube 7 so as to rotate the filter leaves in the filter casing. For washing the cake from the filter leaves a housing 12 is provided along one side of the upper member 2 for receiving the flushing pipe 13 which is adapted to discharge a spray of water upon the filter leaves for the purpose of washing the deposited cake therefrom when desired.

Various other features of the general construction of the filter and the filter casing shown in Figure 1 are clearly described in my copending applications above identified and will not be specifically described herein.

Figure 8:
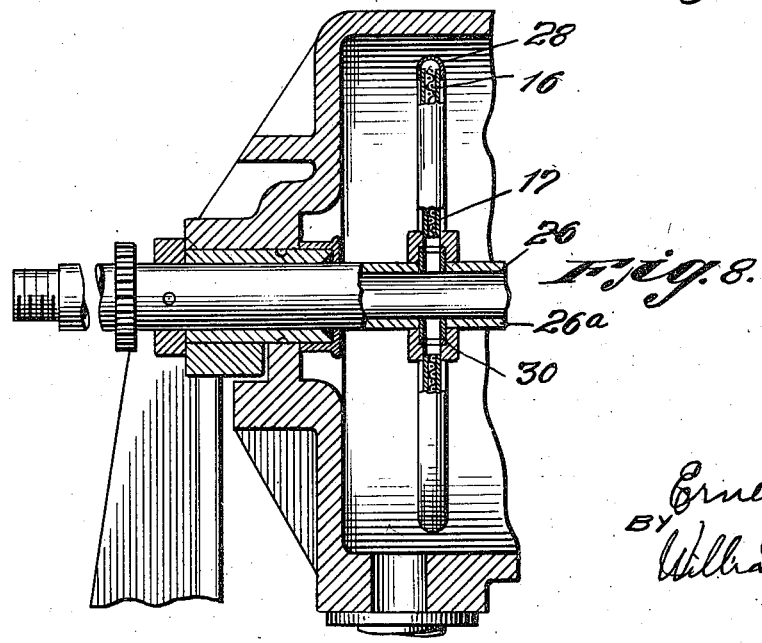
Figure 8 is a sectional detail of a filter casing similar to the one shown in Figure 1 showing the filter element of Figure 7 mounted on the central drainage tube.

Mounted upon the pipes 11 are a plurality of filter leaves 14, each comprising a circular frame 15 provided with an inner drainage member 16 as illustrated in Figure 8, each side of which is covered with a suitable filter fabric 17 so that the solids in the solution being filtered may be deposited thereon while the filtrate passes thru the drainage space into the pipes 11 and out of the filter thru the tube 7. The communication between the central drainage space of the filter element and the pipe 11 is thru a passage 18 in the ear $14^b$ thru which the filtrate is forced or drawn into the pipe 11 but which is arranged to permit the filter leaves to be individually removed from or replaced upon the pipes 11. The filter leaves 14 are secured upon the pipes 11 by means of the ear-like projections $14^b$ which support the filter elements upon the drainage pipes and provide the communication between the filter element and the drainage pipes. The pipes 11 are provided at suitable spaced intervals with nozzles or bushings $11^a$ adapted to be placed in communication with the passage 18 and the ears or projections $14^b$ are divided on the medial line of the pipe 11 and the member containing the passage 18 has hinged to it the member 19 which may be secured by a bolt 21 to the portion of the ear containing the passage 18, so that the member 19 may be swung around the hinge 20 on the member 18 to permit the filter leaf to be placed in communication with the pipe 11 and secured thereto, a gasket 11' insures fluid tight connection between the passage 18 and the bushing $11^a$. By releasing the bolts 21 and swinging member 19 open around the hinge 20, the filter element 14 may be lifted away from the pipes 11 or replaced thereon.

In order to provide as large a filtering area as possible in the space inside the filter casing, I have found it desirable to cut away the filter element as illustrated in the leaf $14^a$ so that the upper half of the leaf as shown in Figure 4 will be of substantially the same diameter as the filter casing while the lower portion is cut away to fit between the drainage pipes 11. In this embodiment communication between the drainage pipes 11 and the filter casing is established by means of a passage $18^a$ leading from the central drainage member of the filter element to the bushing $11^a$ of the pipe 11. Portion $19^b$ of the clamping means is hinged to the upper part of the filter support containing the passage $18^a$ so that by removing the bolts $21^a$ and swinging the portions $19^b$ upon the hinges $20^a$, the filter element $14^a$ may be easily lifted upward from the drainage and supporting pipes 11.

It is to be noted that in each of the embodiments of the filter elements, so far described, the members are not supported on a central drainage pipe from which they could be removed only by providing either a split leaf of the type to be described later or by sliding them from the end of the pipe and that each of the filter elements may be individually removed from the support and drainage pipes 11 without disturbing any of the other filter elements in the assembly.

Another advantage of this construction is that by suitably closing bushings $11^a$ to the drainage pipes, it is possible to space the filter elements at various distances apart so as to accommodate the filter to the filtration of various substances from which thicker or thinner filter cake may be collected.

In the embodiment illustrated in Figure 6, the filter element comprises a split leaf construction composed of two halves 22 and 22ᵃ which may be hinged together at one side as at 23 and provided with suitable clamping means for securing the opposite halves together at 24. The filter leaf herein described is supported upon solid supporting members 11ᵇ which may be arranged somewhat similar to the pipes 11 heretofore described so as to be rotated within the filter casing and the filtrate is discharged thru a central drainage tube 25 as will be described later. The hinge 24 may be arranged so that by turning the halves of the filter a certain distance around the pivot 23, the halves of the leaves may be disconnected so that each may be removed separately from the casing if desired.

In the embodiment of the invention illustrated in Figures 7 to 10, the filter leaves are shown as being supported only upon a central drainage shaft 26 and as being of the split leaf construction so that each of the filter leaves is removable from the central drainage shaft 26 without disturbing any of the remaining leaves upon the shaft.

As illustrated in Figure 7, this type of filter leaf comprises the semi-circular portions 27 and 27ᵃ bounded on their circular and straight sides by suitable U-shaped frame 28 similar to the frame 15 of the filter leaves 14, between the edges of which the filter cloth 17 and the drainage member 16 is retained. The middle of the straight edges or meeting faces of the semi-cylindrical sections is provided with a semi-circular opening 29 adapted to fit around the central drainage tube 26 and the drainage tube is provided on the opposite side thereof with nozzles 26ᵃ adapted to be received in the openings 29ᵃ of the central opening 29 and to have pressed between the edges thereof and of the opening 29ᵃ suitable gaskets 30 to form a fluid tight connection. The filtrate which passes thru the filter cloth 17 is drawn thru the nozzle 26ᵃ into the central drainage pipe 26 and then passes out of the filter casing. The half filter leaves 27 and 27ᵃ are hinged together at 31 and opposite the hinge are provided with a clamp 32 by means of which they may be secured upon the drainage shaft. The drainage shaft is provided with a plurality of nozzles 26ᵃ which may be spaced any desired distance apart so as to secure proper spacing of the filter leaves upon the drainage shaft.

It will be understood that the upper member 2 or the lower member 3 of the filter casing may be removed in a desired manner so as to gain access to the interior of the filter in order to remove any of the individual filter leaves which may become defective in service.

As illustrated in Figure 1, suitable gearing 33, 34 and 35 arranged to be driven from the drainage shaft 7 rotates the cam member 36 which operates the rocker arm 37 attached to the flush pipe 13 to oscillate the pipe 13 so as to direct the spray of water from the pipe in a moving stream over the surfaces of the filter leaves as is fully described in the copending applications of which this application is a continuation in part.

It will be understood that this application is illustrative of only certain preferred means of removing the filter leaves individually from the drainage shaft or supporting members and of supporting the filter leaves upon non-central supports or drainage members and that the invention is not limited to the specific embodiments disclosed herein but embraces broadly the principles of individually removable filter leaves whether supported upon a central or non-central drainage shaft or shafts or upon separate supports and drainage shafts, and that various modifications can be made from the embodiments as illustrated without departing from the spirit of the invention or the scope of the appended claims.

I claim:

1. In a filter of the type described, the combination of a casing, a plurality of rotatable filter leaves whose unbroken filtering area is substantially that of the casing in said casing, non-central supporting and drainage members for supporting and rotating the filter leaves, and means for connecting or disconnecting each filter leaf with the supporting and drainage members, and without disturbing the remaining leaves upon said supporting and drainage members.

2. In a filter of the type described, the combination of a casing, a plurality of filter leaves whose unbroken filtering area is substantially that of the casing and a plurality of non-central supporting and drainage members for supporting and rotating the filter leaves within the casing.

3. In a filter of the type described, the combination of a closed substantially cylindrical casing, a concentric drainage tube passing through the end wall of the casing, a pair of diametrically opposite filter leaf supporting and drainage members inside the casing and communicating with said drainage tube, a plurality of filter leaves of substantially the size of said casing and having centrally unbroken filter surfaces supported by and communicating with said supporting and drainage members and adapted to be rotated in the casing with said members when the drainage tube is rotated.

4. In a filter of the type described, the combination of a substantially cylindrical filter casing, a pair of diametrically opposite filter leaf supporting and drainage members for supporting and rotating the filter leaves within the casing, means to rotate said members, a plurality of filter leaves of substantially the size of the cross sectional area of said casing mounted upon said members, and means for connecting and disconnecting the filter leaves individually from said members.

5. In a filter of the type described, the combination of a substantially cylindrical filter casing, a pair of diametrically opposite filter leaf supporting and drainage members for supporting and rotating the filter leaves within the casing, a plurality of substantially circular filter leaves centrally unbroken adapted to be mounted between said members and means for connecting and disconnecting the filter leaves individually from said members.

6. In a filter of the type described, the combination of a casing, a pair of spaced filter leaf supporting and drainage members, a plurality of substantially circular filter leaves centrally unbroken as a filter medium and substantially the size of the casing, means projecting therefrom for securing the filter leaves upon said supporting and drainage members and for draining the leaves into said supporting and drainage members.

7. In a filter of the type described, the combination of a casing, non-central supporting and drainage means in said casing for solely supporting and rotating a plurality of unbroken filter leaves substantially the size of the case, and hinge means for connecting and disconnecting the filter leaves to the supporting and drainage means.

8. A substantially circular filter leaf comprising a semi-circular portion and a substantially U-shaped portion adapted to fit between a pair of supporting and drainage members and means at the top for detachably securing the filter leaf to said supporting and drainage members.

9. A substantially circular filter leaf comprising a semi-circular portion and a substantially U-shaped portion adapted to fit between a pair of supporting and drainage members, and means between the top of the U-shaped portion and adjacent edge of the semi-circular portion for detachably securing the filter leaf to said supporting ad drainage members.

10. A filter including a plurality of filter elements designed to rotate about an axis substantially perpendicular to the plane of said elements; a supporting structure for said leaves comprising a hollow stub shaft mounted in a suitable bearing and divided into branches parallel to the axis of rotation; means for solely attaching the filter leaves to said branches substantially near the periphery thereof.

11. A filter including a plurality of one piece filter leaves designed to rotate about an axis substantially perpendicular to the plane of said leaves; a supporting structure for said leaves comprising a hollow drainage shaft mounted in a suitable bearing and divided into branches parallel to the axis of rotation, means for solely attaching the filter leaves to said branches at the periphery of the leaves, and means for conducting the filtrate from the filter leaves along the supporting structure into the hollow drainage shafts.

12. A filter comprising a plurality of filter leaves, means for connecting said leaves to a rotatable supporting structure solely at their peripheries, means for forming a sealed joint between a side of each filter leaf and the supporting structure, means for conducting the filtrate along said supporting structure and through a hollow shaft located at the axis of rotation of said structure.

13. A filter comprising a rotatable filter leaf supporting structure mounted in bearings, said structure comprising an unobstructed rectangular frame having side members between which the filter leaves are supported, a plurality of one piece filter leaves supported in said frame, means for forming a sealed joint between a filtrate outlet on each filter leaf and the supporting structure and means for conducting the filtrate out through a hollow shaft located at the axis of rotation.

14. A filter comprising a substantially rectangular hollow rotatable filter leaf supporting structure presenting an unobstructed intermediate portion, a hollow shaft connected at the end of said supporting structure and located at the axis of rotation thereof; a plurality of filter leaves supported within the structure, means for forming a sealed joint between a portion of the supporting structure and each filter leaf and means for conducting the filtrate through the hollow shaft.

15. A filter comprising a stationary casing, a plurality of rotatable filter leaves mounted upon a rotatable supporting structure having a hollow shaft located at the axis of rotation and a connection from the side of each filter leaf to a conduit which leads the filtrate out through said supporting shaft, the filter leaf being supported in said structure by said connection and having an unbroken filtering surface substantially the area of a cross section of the filter casing.

16. In a filter of the type described, a non-rotating casing, rotatable hollow shafts journaled in each end of said casing, an open rectangular frame in said casing connected at each end to said shafts and adapted to rotate therewith and a plurality of filter leaves supported in said frame.

17. In a filter of the type described, a casing, rotatable hollow shafts journaled in each end of said casing, an open rectangular frame in said casing connected at each end to said shafts and adapted to rotate therewith, a plurality of filter leaves supported in said frame, and means to conduct filtrate from the filter leaves to said hollow shafts to the outside of the filter casing.

18. In a filter of the type described, a non-rotating casing, an open frame including a pair of spaced supporting members extending longitudinally of said casing and adapted to support a plurality of filter leaves substantially the size of the casing therebetween, a hollow shaft extending from each end of said frame through the walls of said casing, and journaled to rotate therein, a plurality of nipples on said supporting members adapted to receive the filtrate from the filtrate outlet of the filter leaves, and means to conduct the filtrate from said nipples through said hollow shafts to the outside of the filter casing.

19. In a filter of the type described, a casing, supporting means adjacent the side walls and extending longitudinally of said casing and leaving the center of said casing unobstructed, a plurality of filter leaves supported thereon, means to rotate said supporting means in said casing, spaced nipples on said supporting means adapted to cooperate with the filtrate outlet of said filter leaves, means to clamp the filter leaves to said supporting means, and means to conduct the filtrate from said nipples to the outside of said casing.

20. In a filter of the type described, a substantially cylindrical casing, means to open said casing longitudinally, an open rectangular frame having side members extending longitudinally along each side of the casing and end members extending across each end of said casing, a hollow shaft rotatably mounted in each end of the casing and connected to said end members to support the frame for rotation in said casing, a plurality of filter leaves in said frame supported on said side members, and means adapted to conduct the filtrate from said filter leaves along said side members to the ends of the frame and out of the casing through said hollow shafts.

21. A filter leaf for a filter of the class described comprising a pair of substantially circular unbroken filter surfaces, drainage members attached to the periphery of the filter surfaces and therebetween, the unbroken filter surfaces being substantially of the same area as that of the filter casing, the attachment to the drainage members being such that individual filter leaves may be removed and replaced.

In testimony whereof I have affixed my signature to this specification.

ERNEST J. SWEETLAND.